United States Patent [19]

Donahue

[11] 4,368,475

[45] Jan. 11, 1983

[54] JET DROP COPIER

[75] Inventor: John W. Donahue, Dayton, Ohio

[73] Assignee: The Mead Corporation, Dayton, Ohio

[21] Appl. No.: 256,864

[22] Filed: Apr. 24, 1981

Related U.S. Application Data

[62] Division of Ser. No. 75,064, Sep. 12, 1979, Pat. No. 4,291,340.

[51] Int. Cl.³ ............................................. G01D 15/18
[52] U.S. Cl. ..................................................... 346/75
[58] Field of Search ............... 346/75, 140 R, 140 PD

[56] References Cited

U.S. PATENT DOCUMENTS

| | | | |
|---|---|---|---|
| 3,298,030 | 1/1967 | Lewis et al. | 346/75 |
| 3,656,171 | 4/1972 | Robertson | 346/75 X |
| 3,739,395 | 6/1973 | King | 346/75 |
| 3,956,756 | 5/1976 | Paton | 346/75 |
| 3,972,052 | 7/1976 | Atumi et al. | 197/1 R |
| 4,085,409 | 4/1976 | Paranjpe | 346/75 |
| 4,122,458 | 10/1978 | Paranjpe | 346/75 |
| 4,258,370 | 3/1981 | Paranjpe | 346/75 |

FOREIGN PATENT DOCUMENTS 53-9091 4/1978 Japan .................... 346/75

OTHER PUBLICATIONS

IBM Technical Disclosure Bulletin, vol. 20, No. 8, Jan., 1978, p. 3135, Markowitz, "Multi-Electrode Ink Jet".

Primary Examiner—G. Z. Rubinson
Assistant Examiner—W. J. Brady
Attorney, Agent, or Firm—Biebel, French & Nauman

[57] ABSTRACT

A jet drop copier utilizing a row of electrically scanned jets under multiplexed control of a row of side-by-side photosensing elements. An image of an original document is scanned across the row of photosensors, and the output signals from groups of adjacent photosensors are multiplexed to enable each such group to engage in time shared control of a single jet. The jets are directed toward a print receiving medium, which may be mounted on a rotating drum. Means are provided for causing image scanning movement and the movement of the print receiving medium to proceed in synchronism. A print head for producing the printing directs a row of jets toward a catcher and has a series of printing control electrodes for causing the jets to avoid the catcher on a selective basis. Sideward scanning of printing drops is produced by scanning electrodes comprising vertically spaced electrode elements. A scanning signal is applied to each of the elements with a phase shift corresponding to the time of drop flight from element to element.

7 Claims, 10 Drawing Figures

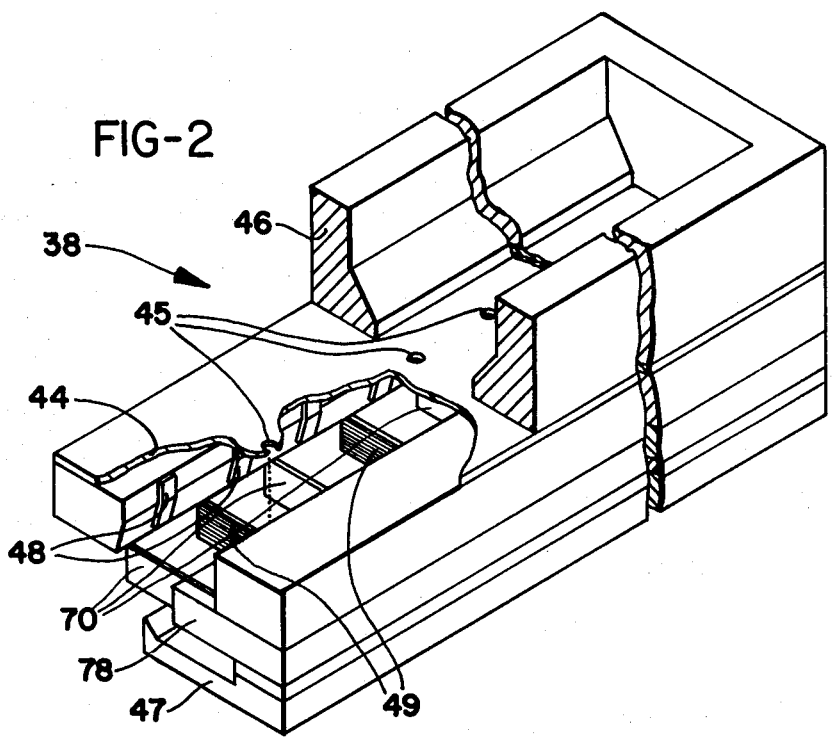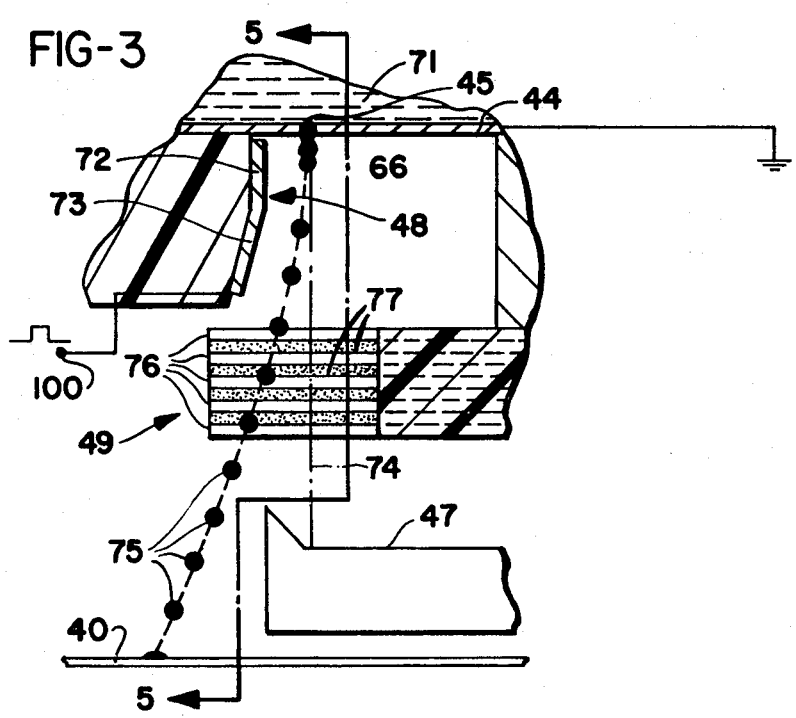

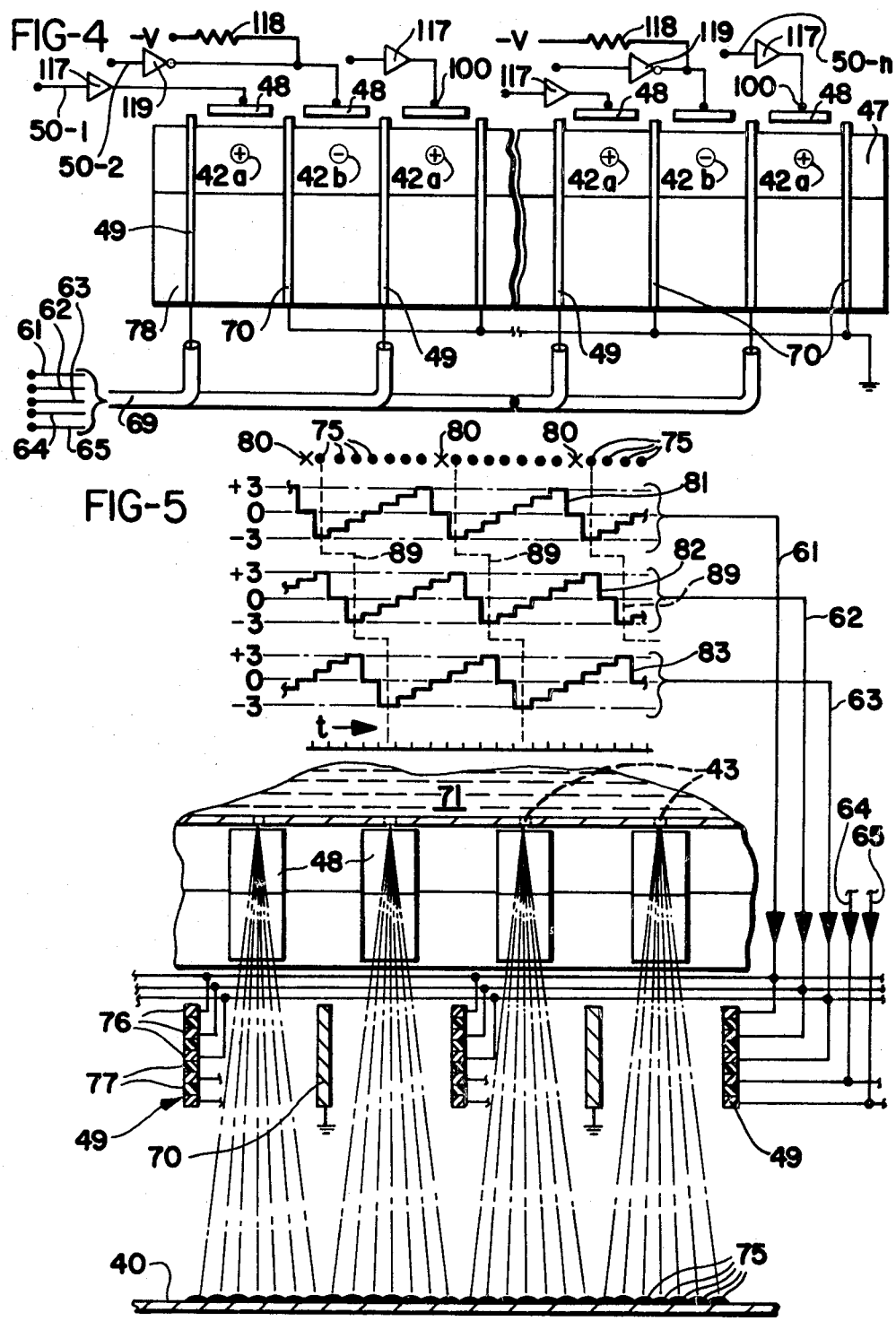

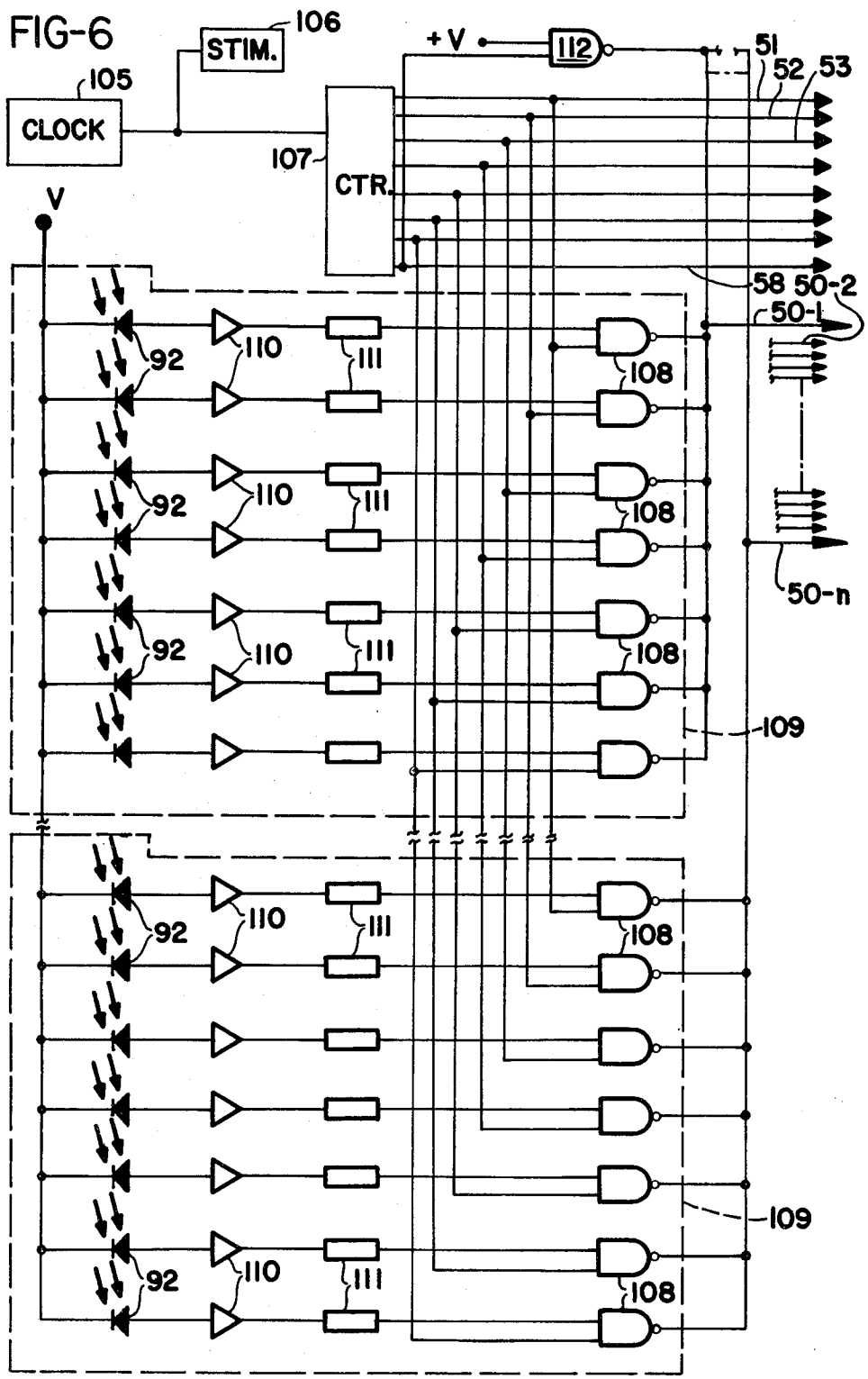

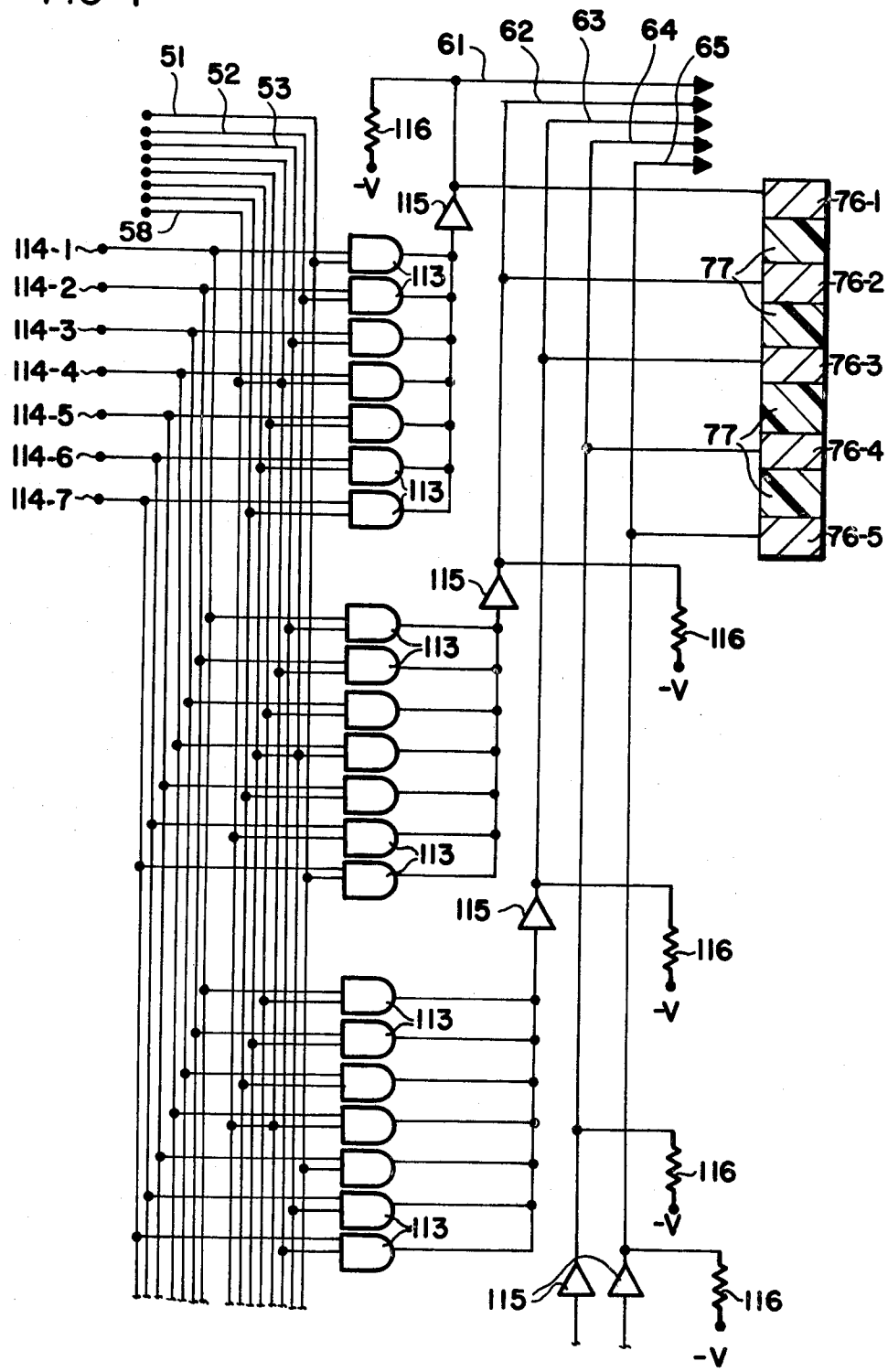

JET DROP COPIER

CROSS-REFERENCE TO RELATED APPLICATION

This application is a division of Ser. No. 075,064, filed Sept. 12, 1979 now U.S. Pat. No. 4,291,340.

BACKGROUND OF THE INVENTION

This invention relates to jet drop copying systems of the general type disclosed in Paranjpe et al U.S. Pat. No. 4,112,469. In such systems an original document is positioned on a document support surface for scanning by an optical scanning system. An array of photosensing elements observes images of picture elements located at different positions within the picture frame being scanned and generates a series of control signals for switching control of a jet drop print head. The jet drop print head produces a line of spaced parallel printing jets, and directs these jets toward a print receiving medium mounted on a rotating drum. The drum is rotated in synchronism with the scanning of the original document under control of a control unit. Means are provided for giving the print head translational movement in a direction parallel to the axis of the rotating drum. The translational movement of the print head causes spiral interlacing of the printed tracks, so that solid printing coverage may be obtained.

The system taught by Paranjpe et al includes means for giving the optical system a translational motion corresponding to the motion of the print head, so that scanning and printing are carried out on a 1 for 1 basis. The photosensing elements accordingly have an arrangement corresponding to the arrangement of the orifices which produce the printing jets. Printing is conducted on a binary basis with each drop of printing liquid being directed either toward a catcher or toward a predetermined printing position.

Another prior art jet drop copier is disclosed in Fox et al, U.S. Pat. No. 4,051,538. Fox et al discloses a copying arrangement wherein a plurality of arrays of binarally switched jets cooperatively print an image upon a sheet mounted on a rotating drum. The printing jets are controlled by data stored within a memory.

Other prior art jet drop copying systems contemplate production of a printed copy during a single printing pass, as taught by Taylor et al, U.S. Pat. No. RE28219, or in King U.S. Pat. No. 3,739,395. Taylor et al contemplates a plurality of arrays of binarily switched jets, while King contemplates one or more arrays of electrostatically scanned jets. The King patent teaches binary deflection in a direction perpendicular to the direction of sideward scanning, with the binary deflection being operative to produce selective catching of drops not intended for printing.

Still another prior art ink jet copying system may use a print head of the general type disclosed in Paranjpe U.S. Pat. No. 4,122,458. In Paranjpe '458 the print head produces a row of jets which extend angularly with respect to a moving print web. Each jet is serviced by a series of vertically separated electrode elements, which are activated in sequence by a travelling voltage. The electrode elements provide deflection fields operative both for catching and scanning of drops.

SUMMARY OF THE INVENTION

This invention provides an improved jet drop copying apparatus utilizing an array of photosensing elements arranged in side-by-side relationship for viewing an image scanned therepast, and a print head generating a row of sidewardly scanned jets which are controlled in response to output signals from the photosensing elements. The photosensing elements collectively view all portions of an original document during a single image scan and generate a series of picture signals corresponding to the picture elements within side-by-side picture columns collectively defining the picture frame to be reproduced.

Each jet is switched under control of picture signals generated by a group of side-by-side photosensing elements. Means are provided for multiplexing samples of the picture signals so as to provide appropriate control of each jet. In the preferred embodiment the print head has a series of charge strips which selectively charge predetermined drops in response to the multiplexed control signals, and the drops which are so charged are deflected by image charges within the charge strips. By this means the selected drops are steered clear of a catcher and travel toward the print receiving medium. The preferred print head comprises a series of drop scanning electrodes extending between the streams, each drop scanning electrode comprising a plurality of vertically spaced electrode elements. A cyclically varying scanning signal is applied to consecutive ones of the electrode elements with a phase shift corresponding to the time of drop flight from element to element.

It is therefore an object of this invention to provide an improved jet drop copying system.

It is another object of this invention to provide an improved jet drop printer for use in a jet drop copying system.

Other and further objects of the invention will be apparent from the following description, the accompanying drawings and the appended claims.

BRIEF DESCRIPTION OF THE DRAWINGS

FIG. 2 is a pictorial illustration of a jet drop print head.

FIG. 3 is a partially cut-away side elevation view of a portion of the jet drop print head of FIG. 2.

FIG. 4 is a schematic top plan view of electrodes comprising a jet drop print head.

FIG. 5 is a view taken along lines 5—5 of FIG. 3 and includes a timing diagram of scanning control signals.

FIG. 6 is a schematic diagram of electrical circuitry for producing printing control signals.

FIG. 7 is a schematic diagram of electrical circuitry for producing scanning control signals.

DESCRIPTION OF THE PREFERRED EMBODIMENTS

Figure 1:
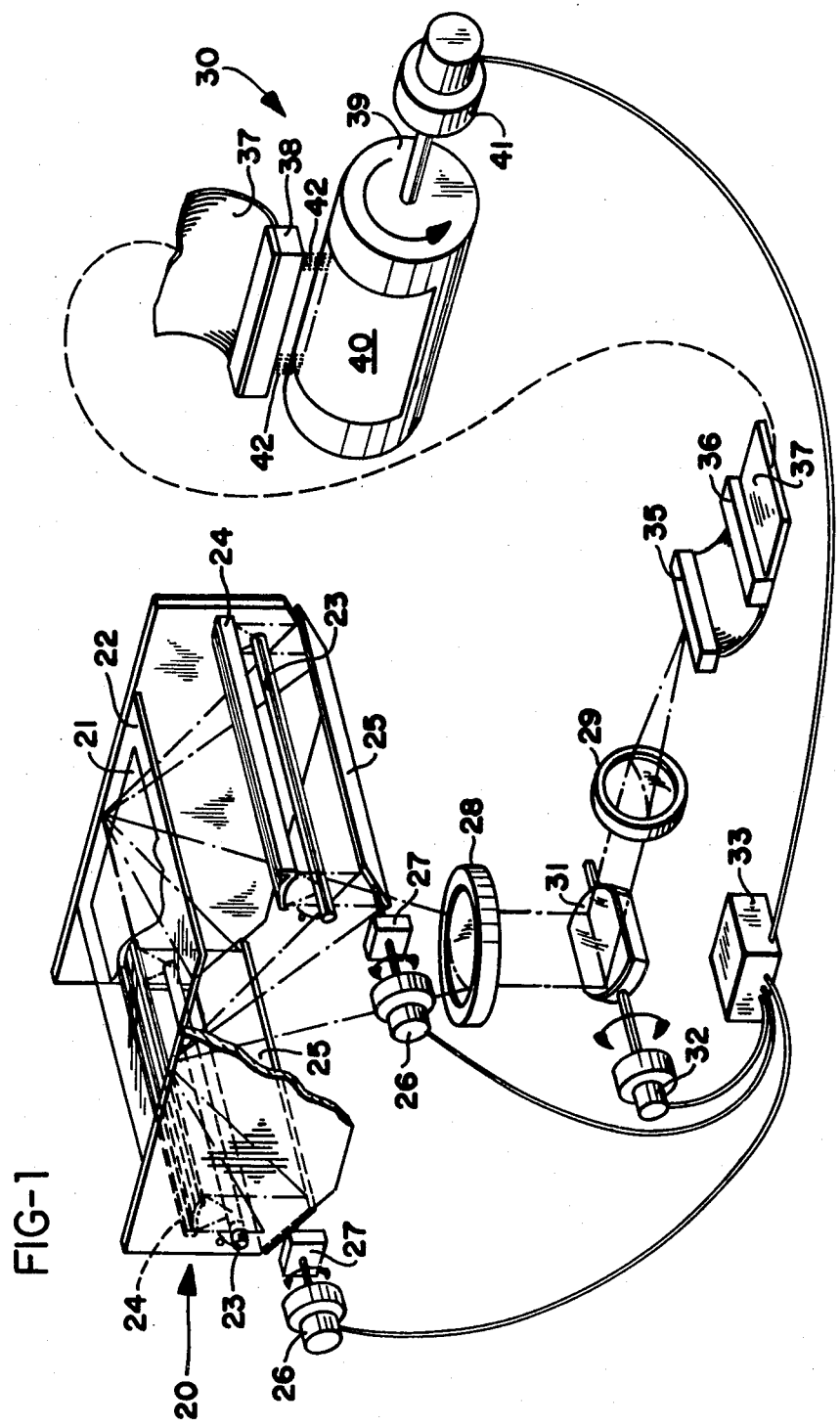
FIG. 1 is a pictorial illustration of a jet drop copying system.

A preferred embodiment of a jet drop copying system according to this invention is illustrated in FIG. 1 as comprising a scanning station and a printing station 30. Scanning station 20 comprises a transparent document support plate 22 for supporting an original document 21. Document 21 is illuminated by a pair of illumination lamps 23, 23 which are positioned at the focal lines of a pair of illumination reflectors 24, 24. Illumination from lamps 23, 23, is collected by reflectors 24, 24, and directed toward document 21 by a pair of rotatable mirrors 25, 25. Mirrors 25, 25, direct elongated beams of light toward common positions on document 21. The beams of light which are so directed define a laterally extending illuminated strip, such as the strip 91 of FIG. 8.

Figure 8:
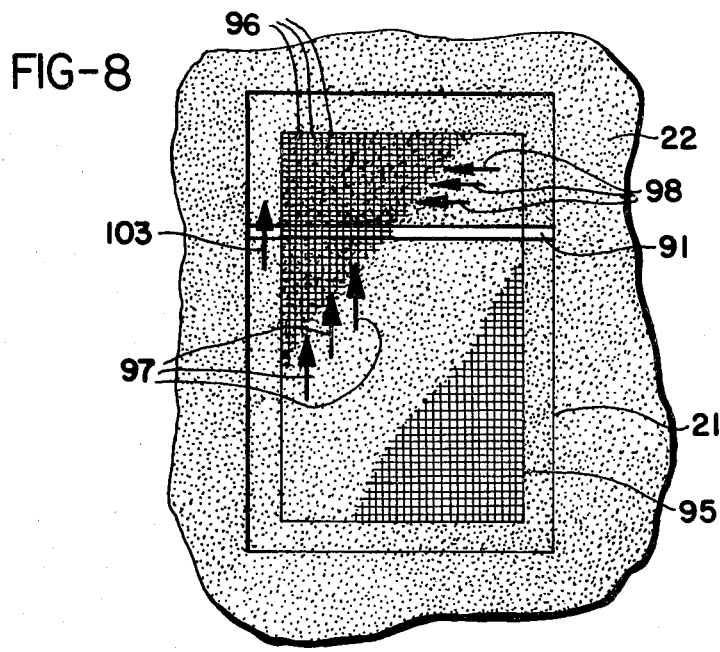
FIG. 8 is a schematic illustration of picture elements comprising a picture frame to be reproduced.

As illustrated in FIG. 8, document 21 comprises an area 95, hereinafter referred to a picture frame. Picture frame 95 may include all or part of the exposed face of document 21 and comprises a series of picture elements 96. Picture elements 96 are arranged in columns 97 and rows 98, as illustrated in FIG. 8. The illuminated strip 91 illuminates all of picture elements 96 within one or more adjacent picture rows 98. Illumination mirrors 25, 25, rotate in synchronism to cause the illuminated strip 91 to proceed along the face of document 21 in the direction illustrated by the arrow 103.

After the strip 91 reaches the end of picture frame 95, mirrors 25, 25, are rotated backwardly toward their starting position. Appropriate oscillating movement of mirrors 25, 25, may be produced by cam mechanisms 27, 27, under control of drive motors 26, 26. Cam mechanisms 27, 27, may comprise conjugate cam mechanisms or other mechanical elements appropriate for such purposes.

Scanning station 20 also comprises an imaging arrangement including a collimating lens 28 and an imaging lens 29. Imaging lens 29 focuses an image of a portion of picture frame 95 against the face of a photodetector array 35. There is an image scanning mirror 31 which rotates in synchronism with the mirrors 25, 25, for causing the image of picture frame 95 to be swept across photodetector array 35. Image scanning mirror 31 is rotated by servo motor 32 under control of control mechanism 33, so that photodetector array 35 always views picture rows 98 which are then being illuminated by the strip 91.

Photodetector array 35 provides a series of picture signals to a print controller 36, which is connected to a jet drop print head 38 by means of a cable 37. Jet drop print head 38 produces a line of parallel jets 42, which are scanned and switched under control of signals carried by cable 37.

The jets 47 are directed toward a print sheet 40 mounted on a rotating drum 39. The sheet 40 may be applied to the drum 39 and removed therefrom by other apparatus known in the art. Printing drum 39 is rotated by drive motor 41 in synchronism with the forward scanning of mirrors 25, 25, and 31. The scanning mirrors fly back during the time interval when the back side of drum 39 is being presented to jets 42. It will be understood that jets 42 are switched into a nonprinting mode during the above mentioned time interval. The appropriate switching is produced by circuitry (not illustrated), located within print controller 36 and operating under control of timing signals from the system controller 33.

Figure 9:
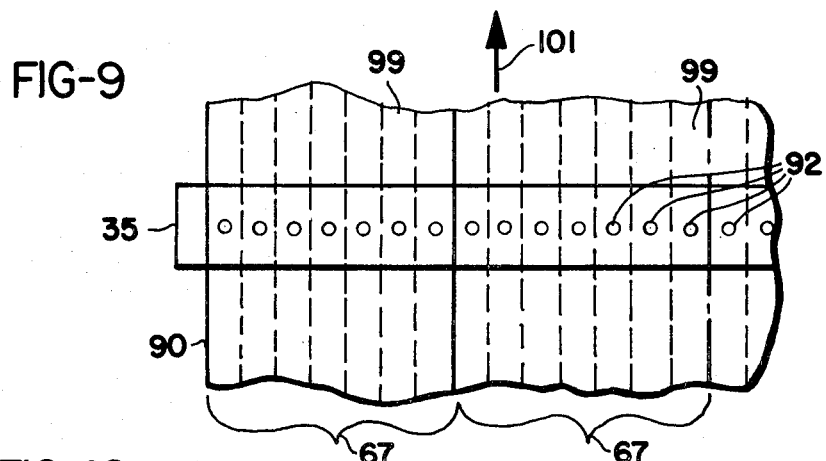
FIG. 9 is a schematic illustration of side-by-side photosensing elements.

Photodetector array 35 comprises a series of side-by-side photosensing elements 92, as illustrated in FIG. 9. Photosensing elements 92 collectively view an image of picture frame 95. This image is indicated in FIG. 9 by the reference numeral 90, it being understood that the image 90 is a spatial image capable of being viewed only when projected against a physical object such as the face of photodetector array 35. It will also be understood that image 90 includes a bright portion (not illustrated) corresponding to picture cells illuminated by light from illumination lamps 23, 23, and a dim portion corresponding to picture elements illuminated only by ambient light.

As illustrated in FIG. 9 image 90 comprises a series of columns 99. Each column 99 corresponds with one of the picture columns 97 of picture frame 95. Photosensing elements 92 each have a field of view corresponding to the field of one picture element 96. The arrangement of photosensing elements 92 is such that they sense picture elements from different picture columns 97. The side-by-side spacing of the photosensing elements 92 enables simultaneous viewing of picture elements from all of the picture columns 97. Each of photosensing elements 92 produces a continuous picture signal, as image 90 moves in the direction of the arrow 101. Picture elements 92 thus produce signals corresponding to the serially sensed information content of each of the image columns 99.

Figure 10:
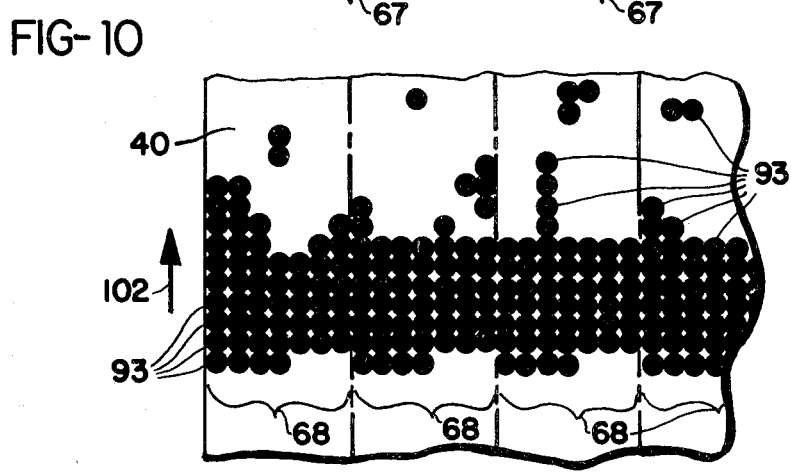
FIG. 10 is a schematic illustration of a set of contiguous printing tracks.

FIG. 10 illustrates a series of contiguous printing tracks 68 which are produced by jets 42. Printing tracks 68 comprise a series of printed dots 93 produced by individual drops of printing liquid. As illustrated in FIG. 10, one printing track 68 may comprise 7 side-by-side columns of printing dots 93. This is the result of sidewardly scanning one jet 42 sidewardly to 7 different printing positions, while printing sheet 40 is being transported in the direction of the arrow 102.

Referring again to FIG. 9, it will be seen that image columns 99 are grouped in column groups 67. Column groups 67 comprise 7 columns 99 for correspondence with printing tracks 68. As hereinafter described in detail, each of jets 42 operates under printing control of a group of photosensors 92 collectively sensing image information within one of the column groups 67. Thus the printing marks 93 printed by one of jets 42 within the 7 columns comprising a printing track 68 correspond to image information viewed by 7 photosensing elements 92 collectively viewing 9 image columns 99 defining a column group 67.

FIG. 2 illustrates a preferred print head 38 for generating, switching and scanning the jets 42.

A preferred embodiment of a print head according to this invention is illustrated in FIGS. 2 through 5, and control circuitry therefor is illustrated in FIGS. 6 and 7. As shown in FIG. 2, print head 38 comprises a manifold 46 communicating with an orifice plate 44. Orifice plate 44 has a series of regularly spaced orifices 45 arranged along a straight line. An appropriate printing liquid supply system, (not shown), supplies a pressurized printing liquid to manifold 46. As illustrated in FIG. 3, the printing liquid 71 flows through orifices 45 in a continuous manner to form a series of liquid filaments 66. Liquid filaments 66 are stimulated in the conventional manner for production of a series of uniformly sized drops 75. Preferred apparatus for producing such stimulation is disclosed in Cha U.S. Patent 4,095,232.

Print head 38 has an elongated catcher 47, which is positioned in alignment with orifices 45. As drops 75 leave the filament 66, they have a natural tendency to follow a straight line path 74 toward the catcher 47. Drops which follow such a straight line path are caught by catcher 47 and produce no printing dots 93 within their assigned printing track 68. A series of printing control electrodes 48 enable printing at predetermined printing positions by deflecting selected drops 75 into curved paths which avoid the catcher 47.

Printing control electrodes 48 each comprise an upper portion 72 and a lower portion 73. Each printing control electrode 48 is connected to an electrical terminal 100, which carries charging control voltages of appropriate duration and magnitude for effecting charging of the selected drops 75. The charging of the selected drops is accomplished by upper electrode portions 72, which are positioned closely adjacent the lower ends of the filaments 66. Drops which are so charged are subjected to the attractive force of image charges induced in lower electrode portions 73. Such charging and deflection is carried out in accordance with the teachings of Robertson U.S. Pat. No. 3,656,171.

Those of drops 75 which are so charged and deflected clear of catcher 47 are subjected to scanning deflection under control of scanning electrodes 49. Scanning electrodes 49 extend inwardly between the streams 42 in alternating fashion with a series of ground electrodes 70. Scanning electrodes 49 and ground electrodes 70 cooperatively produce lateral jet scanning as best illustrated in FIG. 5.

As hereinafter described in detail, scanning electrodes 49 are commonly excited by a series of phase shifted scanning control signals. These scanning control signals cause establishment of a series of time varying electrical deflection fields between scanning electrodes 49 and ground electrodes 70. Due to the alternating arrangement of scanning electrodes and ground electrodes 70, there is a reversal of field direction from jet to jet. Accordingly, printing control electrodes 48 are connected for applying charges of alternating polarity to alternating jets. Thus, as illustrated in FIG. 4, one alternating set of jets 42a may be charged with printing charges of positive polarity, while the other alternating set of jets 42b are charged with printing charges of the negative polarity. By this means, drops 75 which are simultaneously charged by different printing control electrodes 48 are subjected to scanning deflection forces of the same direction and magnitude.

Each of scanning electrodes 49 comprises a plurality of vertically spaced electrode elements 76. Electrode elements 76 are separated by spacers 77, all being molded into a support block 78. A common cable 69 carries a set of scanning control lines 61 through 65 to each of the scanning electrodes 49. Scanning control line 61 through 65 are separately connected to electrode elements 76, as illustrated in FIG. 5. It will be understood that the illustrated arrangement includes 5 electrode elements 76 only as a matter of convenience. Scanning electrodes 49 may include any number of electrode elements 76 as required to achieve a desired amount of scanning deflection. In a typical duplicator operating at a speed of 120 copies per minute at a printing resolution of 20 lines per millimeter, scanning electrodes 49 may have twelve electrode elements 76 and twelve control lines therefor.

Scanning control lines 61 through 65 carry a set of stepped voltage signals, 3 such signals being illustrated in FIG. 5. These signals all have the same wave form, but they are phase shifted relative to each other. The wave forms are cyclically repetitive at a frequency equal to the desired jet scanning frequency.

For the embodiment of the invention as herein described, jets 42 are laterally scanned for coverage of 7 different printing positions per printing track. Thus the 3 scanning control signals, as illustrated at 81 through 83, are characterized by a voltage which is upwardly stepped through 7 different voltage levels. In order to avoid electrical field breakdown, the scanning control voltages are stepped from a maximum negative value up through a maximum positive value. In a typical application the actual voltages may range from −225 volts to +225 volts. Thus each of the voltage steps illustrated in FIG. 5 may correspond to 75 volts in an actual system.

The timing diagram of FIG. 5 also includes a time base t, representations of groups of printing drops 75 and representations of discarded drops 80. Each mark on the time base corresponds to a drop repetition period, so that the spacing between the drops 75 corresponds to the spacing of the marks of the time base. As can be seen from the reference lines 89, the signal 82 is delayed with respect to signal 81 by two time periods. Likewise, time signal 83 is delayed two time periods with respect to signal 82.

Each of electrode elements 76 has a height (vertical thickness) slightly less than the vertical distance traveled by one of drops 75 during one drop repetition. The distance from the top of one electrode element 76 to the top of the next lower electrode 76 is equal to the vertical distance traveled by a drop 75 during two drop repetition periods. For the above mentioned duplicator application, electrode elements 76 may have a vertical thickness of 0.015 cm, and the spacing distance from top to top may be 0.0207 cm. These numbers are consistent with a jet velocity of 2,000 cm per second. The liquid pressure within manifold 46 is adjusted so as to maintain the correct jet velocity.

Due to the above described spacing of electrode element 76 and the phase shifting of the scanning control signals, any charged drop 75 will be subjected to a series of deflection forces of equal magnitude and direction. Thus the first drop in each group of seven drops experiences a deflection force corresponding to a −3 signal level each time it passes one of the electrode elements 76. Similarly the seventh drop in each drop group is subjected to forces corresponding to a +3 signal value. The forth drop in each group is not deflected by the scanning electrodes.

While each drop ideally sees only electrical fields intended for it, as a practical matter the drops are disturbed somewhat by electrical fields intended for the immediately proceeding drops. This effect is most severe for the leading drop in each drop group. Accordingly, provision is made for discarding one drop 80 at the end of each group of 7 drops, so that the scanning control signal can be stepped through the 0 level during the return from a +3 value to a −3 value.

Reference is now made to FIG. 6, which illustrates circuitry for producing printing control signals. The circuitry includes a master clock 105, which drives the system stimulation transducer 106 and also provides clock pulses for a counter 107. Clock 105 therefore operates at the drop stimulation frequency, which may be in the order of about 112 Khz. If desired, clock 105 may be replaced by a counter which counts clock pulses from a higher frequency system control clock.

Counter 107 has 8 output lines 51 through 58. Seven of these output lines 52 through 58 supply gating control signals for a series of 7 NAND gates 108 in each of a series of sampling circuits 109. As described above with reference to FIG. 9, photosensing elements 92 are interconnected in groups for sampling purposes. There is one sampling circuit 109 for each such group of photosensing elements 92. Output signals from photosensing elements 92 are amplified by a series of amplifiers 110 for application to threshold devices 111. Threshold devices 111 provide output signals to AND gates 108 whenever photosensing elements 92 are sensing light levels above a predetermined threshold value. The output signals from threshold circuits 111 are multiplexed onto a series of printing control lines 50-1 through 50-n. Each one of the output lines 50-1 through 50-n is connected to a different one of sampling circuits 109 and controls a different one of printing control electrodes 48. Due to the multiplexing action of NAND gates 108 under control of counter 107, the signals on printing control lines 50-1 through 50-n represents serially arranged samples of printing signals generated by a group of 7 photosensing elements 92. Interspersed with each group of 7 samples is one catching signal (zero level voltage) from NAND gate 112. This interspersed signal from NAND gate 112 provides for catching of the drops indicated by reference numeral 80 of FIG. 5.

The counting signals on lines 51 through 58 are also applied to a series of AND gates 113 as illustrated in FIG. 7. There are 5 groups of AND gates 113, 3 such groups being illustrated in FIG. 7. Each group of AND gates 113 produces a scanning control signal for one of the scanning control lines 61 through 65.

AND gates 113 are transitor switches for switching a series of 7 different voltages appearing on terminals 114-1 through 114-7 into the input terminals of amplifiers 115. Amplifiers 115 provide a series of stepped output signals for transmission through resistors 116. If resistors 116 were not employed, then then amplifiers 115 would provide positive polarity signals on line 61 through 65, stepped from 0 volts to maximum value which may be in the neighborhood of 450 volts. Resistors 116 are connected to sources of negative potential for adjusting the reference level of the signals appearing on scanning control lines 61 through 65. The result is a series of scanning control signals which are stepped from −225 volts to +225 volts and which have wave forms as illustrated in FIG. 5. The signals appearing on scanning control lines 61 through 65 are applied to electrode elements 76-1 through 76-5 respectively.

The printing control signals appearing on alternate ones of printing control lines 50-1 through 50-n are applied to printing control electrodes 48 via amplifiers 117. The printing control signals appearing on the other alternate printing control lines are amplified and plurality inverted by inverting circuits comprising resistors 118 and inverting amplifiers 119.

While the preferred printing head of this invention is configured as above described, other types of printing heads are suitable for use in a jet drop copying system as generally illustrated in FIG. 1 and including sampling circuits as illustrated in FIG. 6. The only requirement is that means be provided for electrically scanning the jets 42, and this could be accomplished by variable level charging and catching, as generally taught in Paton U.S. Pat. No. 3,956,756. Another embodiment could apply stepped scanning signals to single piece scanning electrodes as disclosed in King U.S. Pat. No. 3,739,395.

While the form of apparatus herein described constitutes a preferred embodiment of the invention, it is to be understood that the invention is not limited to this precise form of apparatus, and that changes may be made therein without departing from the scope of the invention.

What is claimed is:

1. Jet drop printing apparatus comprising,
    a manifold including means defining a series of uniformly spaced orifices arranged along a straight line,
    printing liquid supply means for supplying printing liquid to said manifold and causing said liquid to exit through said orifices as a row of parallel streams of drops,
    an elongated catcher arranged parallel to said line of orifices and positioned for catching those of said drops which follow straight line paths from their orifices,
    printing control means for selectively charging predetermined ones of said drops and deflecting said predetermined drops in a first direction to avoid said catcher,
    a series of drop scanning electrodes extending between said streams for causing drop scanning in a second direction perpendicular to said first direction, and
    scanning signal means for applying a cyclically varying scanning signal to said scanning electrodes;
    characterized in that at least alternate ones of said scanning electrodes comprise a plurality of vertically spaced electrode elements and in that said scanning signal is applied to consecutive ones of said electrode elements with a phase delay corresponding to the time required for one of said drops to travel from one electrode element to the next.

2. Apparatus according to claim 1 characterized in that said scanning electrodes are positioned between alternate ones of said streams and that ground electrodes are positioned between the other alternate ones of said streams.

3. Apparatus according to claim 2 characterized in that said printing control means applies positive charges to said predetermined drops in alternate ones of said streams and negative charges to said predetermined drops in the other alternate ones of said streams.

4. Apparatus according to any of claims 1 through 3 characterized in that said scanning signal is a signal of progressively stepping voltages which range between equal values of opposite polarity.

5. Apparatus according to claim 4 characterized in that said scanning signal has a step of zero voltage at the end of each cycle thereof and further in that said printing control means causes catching of one drop in each of said stream at the end of each scanning sweep of the streams.

6. Apparatus according to claim 5 characterized in that said printing control means comprises a conductive surface for enabling deflection of charged drops by self induced image charges.

7. Apparatus according to claim 1 characterized in that said printing control means comprises a conductive surface for enabling deflection of charged drops by self induced image charges.

* * * * *